Jan. 9, 1940.  J. L. FLEMING  2,186,481
VALVE
Filed Jan. 31, 1938

Inventor
James Leo Fleming
By Lyon & Lyon
Attorneys

Patented Jan. 9, 1940

2,186,481

UNITED STATES PATENT OFFICE 2,186,481

VALVE

James Leo Fleming, Los Angeles, Calif.

Application January 31, 1938, Serial No. 187,797

6 Claims. (Cl. 277—53)

This invention relates to valves and has particular application to valves employed for controlling fluid flow through pipe lines which are in continuous service.

An object of the invention is to reduce the installation and maintenance expense of valve lines in continuous service.

A more specific object is to provide a practical unit for insertion in a fluid flow line which unit includes a regular service valve and an emergency service valve both so mounted in a plug valve that either the regular or the emergency service valve may be quickly connected into the line and the other valve not only disconnected from the line but made accessible for repairs.

Other more specific objects and features of the invention will become apparent from the following detailed description, with reference to the drawing, of one particular, preferred embodiment of the invention.

Figure 1:
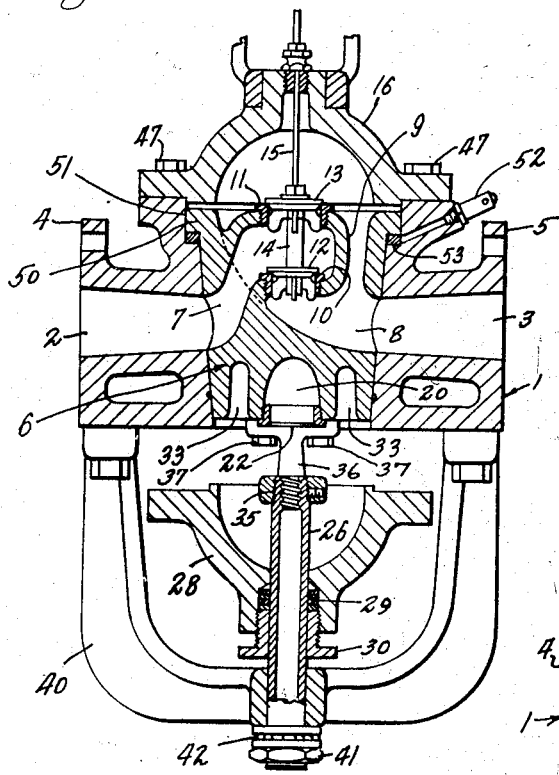
Fig. 1 is a vertical longitudinal sectional view through a plug valve incorporating two service valves in accordance with the invention, with the lower service valve disassembled.

Referring to the drawing, the valve therein disclosed comprises a casing I having a pair of alined longitudinal fluid passages 2 and 3, respectively, extending from flanged ends 4 and 5, respectively, of the casing. Valves of the type referred to are commonly made in relatively large sizes and are connected into a pipe line by bolting the flanges on the ends 4 and 5 of the valve casing to flanges (not shown) on the ends of the abutting pipe sections.

In addition to the fluid passages 2 and 3, the casing I has a tapered or conical opening extending completely therethrough and intersecting the passages 2 and 3, in which is mounted a rotatable plug 6, the latter being ground to fit in the opening provided therefor in the casing I so as to effect a fluid seal therewith. The plug 6 is adapted to be positioned in either one of two positions displaced 90° from each other, the plug being shown in one of such positions in Fig. 1 and in the other position in Fig. 2. The plug contains two separate systems of passages, one of which interconnects the passages 2 and 3 in the valve casing I when the plug is in the position shown in Fig. 1, and the other of which systems interconnects the passages 2 and 3 when the plug is in the position shown in Fig. 2. Separate and independent service valves are incorporated in these two systems of passages.

Referring to Fig. 1, one system of passages in the plug 6 comprises a passage 7 adapted to communicate with the passage 2 in casing I and a passage 8 which is adapted to be communicated with the passage 3 in casing I, and also is permanently communicated with the upper end of plug 6. The passages 7 and 8 are separated by a wall member 9 which has two vertically alined openings, the lower of which communicates the passage 8 directly with the passage 7 and the upper of which directly communicates the passage 7 with the space above the upper end of the plug 6. The lower opening referred to is provided with a valve seat 10 and the upper opening is provided with a valve seat 11. Both of these valve seats have valve-engaging surfaces at their upper corners and cooperate with a pair of valves 12 and 13, respectively, both of which are mounted on a common central shaft 14 and are adapted to be raised and lowered on a stem 15 which extends upwardly above the flange 13 and through a closure member or bell cover 16 on the upper end of the casing I. This cover 16 seals with the casing I to form a fluid-tight enclosure above the upper end of the plug 6.

As will be apparent from an inspection of Fig. 1, the upper surface of valve 13 and the lower surface of valve 12 are exposed to fluid in passage 8 whereas the opposite surfaces of these two valves are exposed to fluid in the passage 7. Therefore, regardless of differences in pressure of fluid in the passages 7 and 8, the forces applied to the valve structure are always balanced and the valve can be opened or closed with very little power by merely raising or lowering the stem 15.

Figure 2:
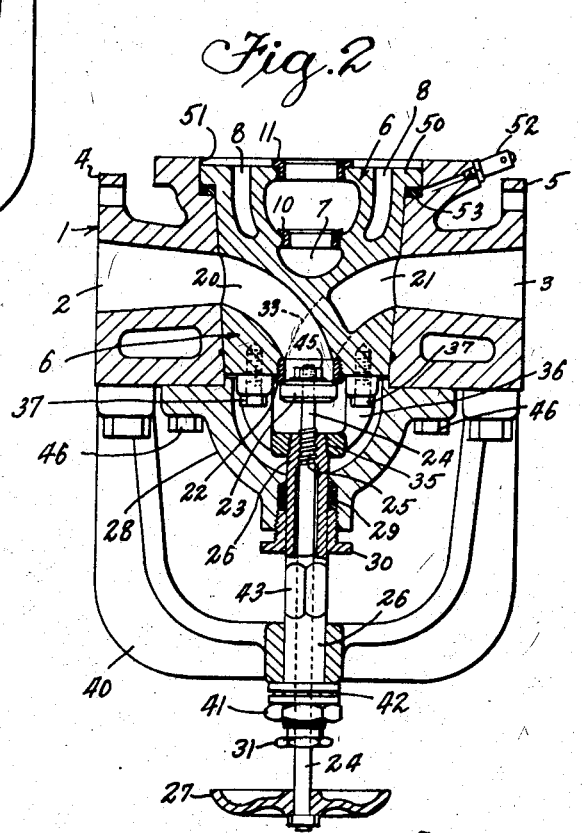
Fig. 2 is a view similar to that of Fig. 1 but with the plug of the valve 90° displaced from the position shown in Fig. 1 and with the upper service valve disassembled.

Referring now to Fig. 2, the other system of passages in the plug 6 comprises a passage 20 adapted to communicate with the passage 2 in casing I and a passage 21 adapted to communicate with the passage 3 in casing I. The passage 20 extends from the side of the plug, where it communicates with the passage 2 to and through the lower end of the plug at the center thereof and its lower orifice is defined by a valve seat 22. This valve seat 22 cooperates with a valve 23 positioned therebelow and mounted on a stem 24 having screw threads 25 engaging threads in a hollow shaft or sleeve 26 through which the stem 24 extends. Stem 24 extends beyond the lower end of the sleeve 26 and is provided with a hand-wheel 27 for easy rotation to close and open the valve 23. The space below the plug 6 is closed by a cover 28 bolted onto the casing 1 with bolts 46. The sleeve 26 passes through an aperture provided therefor in the cover 28 and a seal is effected between the cover 28 and the sleeve 26 by means of packing 29 adapted to be compressed by a packing nut or gland 30. The stem 24 is similarly sealed with respect to the sleeve 26 through which it passes with a packing adapted to be compressed by a packing gland or nut 31.

Figure 4:
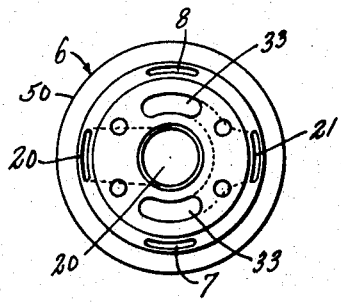
Fig. 4 is a bottom view of the plug of the valve.
Figure 3:
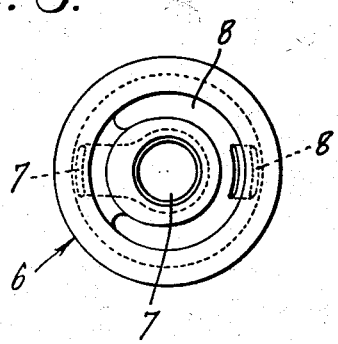
Fig. 3 is a plan view of the top of the plug of the valve.

It will be observed from the construction already described that the passage 20 is adapted to be communicated through the valve 23 with the enclosed space below the end of the plug 6. The passage 21 is in permanent communication with this space. Thus the passage 21 is divided and extends downwardly through the plug 6 on opposite sides of the passage 20, terminating in two orifices 33 in the lower end of the plug, as shown in Fig. 4. When the plug 6 is in the position shown in Fig. 2, the valve 23 is open and fluid can flow from the passage 2 through the passage 20 into the space below the end of the plug, thence through the orifices 33 into the passage 21 and into the passage 3. The rate of flow may be controlled, of course, by adjusting the valve 23 with handle 27.

The sleeve 26, in addition to functioning as a support for the stem 24 has the important function of retaining the plug 6 in seated relation with the casing 1. Thus at its upper end the sleeve 26 is secured, as by threads 35, to a bracket 36 which is bolted as by bolts 37 to the lower end of the plug 6 on opposite sides of the valve seat 22. Sleeve 26 extends through the cover 28 a substantial distance and through an aperture provided therefor in a yoke 40 which is anchored at its ends to the valve casing 1. On its lower end the sleeve 26 is provided with a shoulder nut 41 which is adjustable to engage a bearing member 42 which surrounds the sleeve 26 and is positioned between nut 41 and the yoke 40. This bearing 42 is shown as a ball bearing to reduce the frictional resistance to turning of the plug. The sleeve 26 is provided with an octagonal exterior surface portion 43 between the packing nut 30 and the yoke 40 for the application of a wrench to turn the sleeve and the plug 6 from one position to another.

From the description given so far, it will be apparent that when the plug 6 is turned to the position shown in Fig. 1, the passages 7 and 8 in the plug are alined with the passages 2 and 3, respectively, in the casing 1, and flow of fluid through the valve is controlled by the valves 12 and 13. Under these conditions, the passages 20 and 21, associated with the valve 23, are closed at their lateral ends and the valve 23 is out of service so that it can be repaired, if necessary. Likewise, when the plug is turned in the position shown in Fig. 2, the passages 20 and 21 are alined with the passages 2 and 3 of the plug of casing 1 and fluid flow through the line is controlled with the valve 23. At such times, the passages 7 and 8 of the plug are disconnected at their outer ends from the casing passages 2 and 3 and the valves 12 and 13 may be opened up for repairs.

To gain access to the valve 23 when the plug is in the position shown in Fig. 1, the bolts holding the cover 28 to the casing 1 are removed and the cover is dropped down into the position shown in Fig. 1. The valve 23 and the stem 24 are then retracted by rotating the handle 27 until a nut 45 on the upper end of stem 24, which nut secured the valve 23 on the stem 24, can be removed with a wrench inserted between the upper edge of the cover 28 and the casing 1. After the nut 45 has been removed the valve 23 can be lifted off the upper end of the stem 24 and thereafter the stem can be completely removed from the sleeve 26. The valve 23, after being removed, can be replaced with a new valve or can be repaired. If necessary, the seat 22 can be removed for repairs or replacement while the valve 23 is out.

The parts are reassembled in the reverse order in which they were disassembled and the cover member resecured in position on the casing 1 with the bolts 46.

When the valve structure in the communicating passages 7 and 8 is to be repaired, the plug 6 is turned into the position shown in Fig. 2, which places the valve 23 in service and the valves 12 and 13 out of service. The upper cover member 16 is then removed from the casing 1 by removing the bolts 47, holding the cover in place. After removal of the bolts 47 the cover 16 can be lifted clear off the casing, thereby completely exposing the upper end of the plug 6. It will be noted that the plug 6 cannot escape from the casing 1 because it is secured in place by the sleeve 26, bearing 42 and yoke 40, as previously described. With cover 16 removed, the valve assembly, including the valves 12 and 13, the shaft 14, and stem 15, can be lifted out of the plug and replaced or repaired. With the valve structure removed, the valve seats 10 and 11 may also be removed. The valve seat 11 is preferably made of slightly larger external diameter than the valve seat 10 so that the latter may be easily removed through the aperture for the seat 11. The upper valve structure is reassembled by simply inserting the seats 10 and 11, dropping the valve assembly in place, and replacing the cover 16.

The plug 6 may be provided on its upper end with an outwardly extending flange 50 having a cylindrical peripheral surface fitting in a cylindrical recess 51 at the upper end of the conical opening in the body 1, in which the plug seats, and a fitting 52 may be provided through which lubricant under pressure may be introduced into the space 53 below flange 50 to free the plug in case it should be frozen. As is readily understood by those skilled in the art, plug valves that are left in one position for a long period of time sometimes seat so tightly that it is impossible to turn the plug without first breaking it loose from its seat. However, the movement of the plug necessary to free it is very slight and in the particular form of the invention shown such movement is permitted due to the inherent resilience of the yoke 40 by which the sleeve 26 is longitudinally supported.

As previously pointed out, the sleeve 26 and yoke 40 constitute the seal means for retaining the plug in seated engagement in the valve body.

It may be desirable, in some instances, to provide packing means in the recess 53, as shown in the drawing, to effect a better seal at the contact of the flange 50 with the recess wall 51.

It is to be understood that while a conventional form of grease fitting 52 has been shown for supplying lubricant to the recess 53 that other means may be employed, and, if desired, the means for forcing the lubricant may merely consist of a threaded passage in the valve body with a screw plug, whereby grease inserted in the passage may be compressed and forced into the recess 53 by screwing in the plug.

Although the invention has been explained by describing in detail one particular embodiment of the invention, it is to be understood that various changes and modifications can be made in the particular structure shown without departing from the invention, which is to be limited only as set forth in the appended claims.

I claim:

1. A valve comprising a casing having a plug opening and fluid passages communicating with said plug opening, a plug in said opening having two distinct systems of passages therein for independently intercommunicating the fluid passages in said casing in two different positions of said plug, in which each of said passage systems includes a separate valve operable independently of the other for controlling flow of fluid therethrough.

2. A valve comprising a casing having a plug opening therein and having fluid passages communicating with said plug opening, a plug in said opening having two distinct systems of passages therein for independently intercommunicating the passages in said casing in two different positions of said plug, one at least of said systems of passages comprising a pair of passages each extending between the bearing surface of the plug and one end of the plug, means forming an enclosure about one end of said plug, and valve means controlling fluid flow from one of said passages to the space within said enclosure.

3. A valve comprising a casing having a plug opening therein and fluid passages communicating therewith, a plug in said opening having two distinct systems of passages therein extending through the plug and terminating in the bearing surface thereof for independently intercommunicating the passages in said casing in two different positions of said plug, in which one of said systems of passages comprises a pair of passages each extending between the bearing surface of the plug and one end of the plug, and the other system of passages comprises a pair of passages each extending between the bearing surface of the plug and the other end of the plug, means forming a fluid-tight enclosure about each end of said plug, and independent valve means for controlling fluid flow between one passage of each of said two systems of passages and the space at the end of the plug with which that passage communicates.

4. A valve comprising a casing and a tapered plug rotatably mounted in a tapered opening provided therefor in said casing, detachable cover means for said casing defining with said casing a fluid chamber about the small end of said plug, sleeve means secured to said plug and extending axially therefrom through said cover, means engaging said sleeve and preventing axial movement thereof in such direction as to loosen said plug, fluid passages in said plug communicating the lateral surface of the plug with the small end of the plug, valve means for controlling fluid flow through said passages, and an actuating stem for said valve means extending through said sleeve.

5. A valve as defined in claim 4, in which one of said passages in said plug terminates in a valve seat centrally disposed in the small end of said plug, in which said sleeve is anchored to said plug with a yoke straddling said valve seat and in which said valve is positioned within said last mentioned yoke.

6. A valve comprising a casing having a plug opening therein and a pair of fluid passages communicating with said opening, a plug in said opening in sealing engagement with said casing, means defining a first chamber within said plug communicating with the lateral surface of the plug at one point, a second chamber in communication with the lateral surface of the plug at another point, a pair of valve seats axially alined with respect to said plug, and positioned in juxtaposed portions of the wall of said first chamber and communicating said first chamber with said second chamber, a pair of valves one associated with each of said valve seats and one mounted for opening movement from its seat inside said first chamber and the other mounted for opening movement from its seat exterior of said first chamber, means for opening and closing said valves simultaneously, said chambers communicating with the lateral surface of the plug at such points as to register with the fluid passages in the casing in one position of said valve, and said plug having other passage means adapted to intercommunicate said casing passages in another position of said plug.

JAMES LEO FLEMING.